United States Patent
Zhan et al.

(10) Patent No.: US 11,622,087 B2
(45) Date of Patent: Apr. 4, 2023

(54) IMAGE SENSOR WITH IN-PIXEL BACKGROUND SUBTRACTION AND MOTION DETECTION

(71) Applicant: OMNIVISION TECHNOLOGIES, INC., Santa Clara, CA (US)

(72) Inventors: Zhiyong Zhan, Fremont, CA (US); Tongtong Yu, Fremont, CA (US); Zheng Yang, San Jose, CA (US); Wei Deng, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 242 days.

(21) Appl. No.: 17/167,768

(22) Filed: Feb. 4, 2021

(65) Prior Publication Data
US 2022/0247943 A1   Aug. 4, 2022

(51) Int. Cl.
*H04N 5/353*   (2011.01)
*H04N 5/3745*   (2011.01)
*H04N 5/33*   (2006.01)

(52) U.S. Cl.
CPC .............. *H04N 5/353* (2013.01); *H04N 5/33* (2013.01); *H04N 5/3745* (2013.01)

(58) Field of Classification Search
None
See application file for complete search history.

(56) References Cited

U.S. PATENT DOCUMENTS

| 2005/0218299 | A1* | 10/2005 | Olsen | H04N 5/378 348/E3.029 |
| 2007/0200942 | A1* | 8/2007 | Xu | H04N 5/3765 348/E5.079 |
| 2017/0064219 | A1* | 3/2017 | Lin | H04N 5/33 |
| 2021/0021769 | A1 | 1/2021 | Gao et al. | |

OTHER PUBLICATIONS

U.S. Appl. No. 17/121,423, filed Dec. 14, 2020, 45 pages.

* cited by examiner

*Primary Examiner* — Clifford Hilaire
(74) *Attorney, Agent, or Firm* — Perkins Coie LLP

(57) ABSTRACT

An imaging system includes a pixel array configured to generate image charge voltage signals in response to incident light received from an external scene. An infrared illumination source is deactivated during the capture of a first image of the external scene and activated during the capture of a second image of the external scene. An array of sample and hold circuits is coupled to the pixel array. Each sample and hold circuit is coupled to a respective pixel of the pixel array and includes first and second capacitors to store first and second image charge voltage signals of the captured first and second images, respectively. A column voltage domain differential amplifier is coupled to the first and second capacitors to determine a difference between the first and second image charge voltage signals to identify an object in a foreground of the external scene.

13 Claims, 3 Drawing Sheets

IMAGE SENSOR WITH IN-PIXEL BACKGROUND SUBTRACTION AND MOTION DETECTION

BACKGROUND INFORMATION

Field of the Disclosure

This disclosure relates generally to image sensors, and in particular but not exclusively, relates to an image sensor for monitoring an external scene.

Background

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
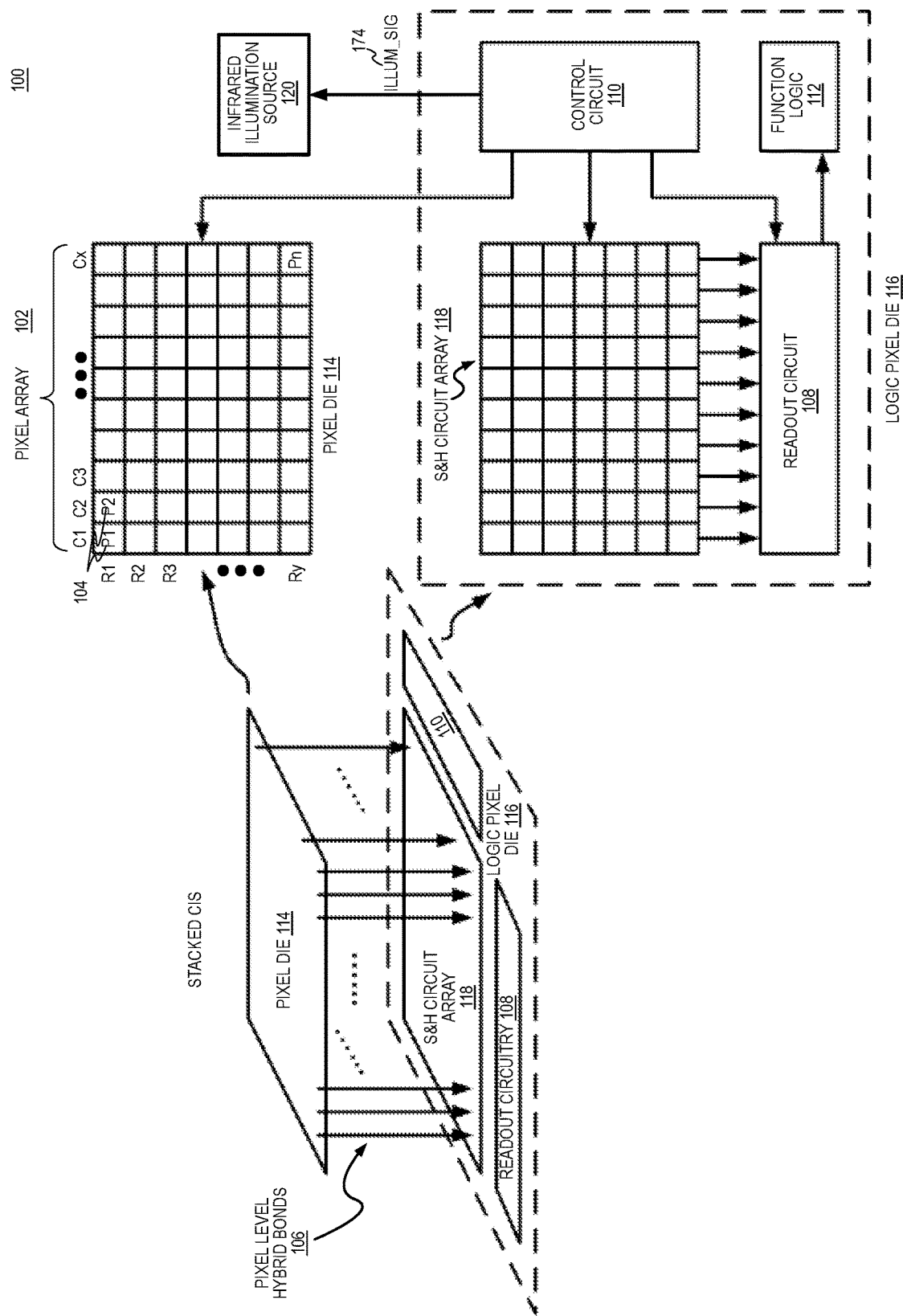
FIG. 1 illustrates one example of an imaging system including a voltage domain global shutter image sensor with an infrared illumination source to enhance signal detection of an object of interest in the foreground of an external scene in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Various examples of an imaging system including a voltage domain global shutter image sensor with an infrared illumination source to enhance signal detection of an object of interest in the foreground of an external scene are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship relative to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein are interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed in greater detail below, an example imaging system in accordance with the teachings of the present invention includes a voltage domain global shutter sensor that utilizes an illumination source every other image capture to enhance detection of an object in the foreground of an external scene. In the various examples, a first image of the external scene is captured without any illumination from the illumination source, and then a subsequent second image of the external scene is captured with illumination from the illumination source in sequence. In the examples, the illumination from the illumination source is configured to substantially illuminate an object in the foreground of the external scene while the background is substantially not illuminated in the second image. As a result, the first image is subtracted from the second image to determine the differences between the first image and the second image. The resulting final output from the subtraction distinguishes the differences between the first image and the second image, which can be used to identify an object in the foreground of the external scene and/or identify any motion that has occurred in the external scene between the first and second image captures in accordance with the teachings of the present invention.

In various examples, the illumination source is implemented with a light emitting diode (LED) infrared (IR) illumination source. In one example, the light produced by the LED IR illumination source has a wavelength substantially equal to 940 nanometers, which is not visible to the human eye. As such, an imaging system in accordance with the teachings of the present invention is useful in a variety of applications such as for example a monitoring system utilized as a vehicle camera to monitor a driver of the vehicle for facial status, eyelid motion, etc. Since the IR light generated by the illumination source is not visible to the driver, the imaging system is capable of constantly monitoring the driver without distracting the driver. Other applications of an imaging system in accordance with the teachings of the present invention may include, but are not limited to, augmented reality (AR) applications, virtual reality (VR) applications, etc.

To illustrate, FIG. 1 illustrates one example of an imaging system 100 including a voltage domain global shutter image sensor with an infrared illumination source to enhance signal detection of an object of interest in the foreground of an external scene in accordance with the teachings of the present invention. As shown in the example depicted in FIG. 1, imaging system 100 is implemented as a complementary metal oxide semiconductor (CMOS) image sensor (CIS) in a stacked chipped scheme that includes a pixel die 114 stacked with a logic pixel die or application specific integrated circuit (ASIC) die 118. In the example, the pixel die 114 includes a pixel array 102, and the logic pixel die 116 includes an array of sample and hold circuits 118 that are coupled to the pixel array 102 through pixel level hybrid bonds 106. Logic pixel die 130 also includes a control circuit 110, a readout circuit 108, and function logic 112.

In one example, pixel array 102 is a two-dimensional (2D) array of photodiodes, or image sensor pixel cells 104 (e.g., pixel cells P1, P2 . . . , Pn). As illustrated, photodiodes are arranged into rows (e.g., rows R1 to Ry) and columns (e.g., column C1 to Cx) to acquire image data of a person, place, object, driver, scene, etc., which can then be used to render a 2D image of the person, place, object, driver, scene, etc. It is appreciated, however, that the photodiodes do not have to be arranged into rows and columns and may also take other configurations in accordance with the teachings of the present invention.

As shown in the depicted example, the logic pixel die 116 is stacked with and coupled to the pixel die 114 in a stacked chip scheme. In the example, the logic pixel die 116 includes an array of sample and hold circuits 118 coupled to the readout circuit 108. In the example, each one of the sample and hold circuits included in the array of sample and hold circuits 118 is coupled to a corresponding one of the pixel cells 104 of the pixel array 102 in the pixel die 114 through a respective pixel level hybrid bond 106 at an interface between the pixel die 114 and the logic pixel die 116, which provides a voltage domain global shutter image sensor in accordance with the teachings of the present invention. In particular, each one of the sample and hold circuits included in the array of sample and hold circuits 118 includes first and second capacitors configured to store pixel data of the first image and the second image, respectively, in the voltage domain.

As will be described in greater detail below, a full column voltage domain differential amplifier is coupled to the sample and hold circuits of each column of the array of sample and hold circuits 118 to subtract the first image pixel data from the second image pixel data to determine the differences between the first image and the second image for each row of the array of sample and hold circuits 118. The resulting final output from the subtraction distinguishes the differences between the unilluminated first image and the illuminated second image, which can be used to identify an object in the foreground of the external scene and/or identify any motion that has occurred in the external scene between the first and second image captures in accordance with the teachings of the present invention.

The readout circuit 108 may be used to readout the first and second image data and the resulting differences between the first and second image data, which may then be transferred to function logic 112. In one example, the full column voltage domain differential amplifier may be included in the readout circuit 108. In various examples, readout circuitry 108 may also include amplification circuitry, analog to digital (ADC) conversion circuitry, or otherwise. In one example, function logic 112 may simply store the image data or even manipulate the image data by applying post image processing effects (e.g., crop, rotate, remove red eye, adjust brightness, adjust contrast, or otherwise).

In one example, control circuit 110 is coupled to the pixel array 102, the sample and hold circuit array 118, the readout circuit 108, and the infrared illumination source 120 to control and synchronize the operation of the pixel array 102, the sample and hold circuit array 118, the readout circuit 108, and the infrared illumination source 120. In one example, the control circuit 110 is configured to have the imaging system 100 capture a first image of an external scene with the infrared illumination source 120 deactivated. In the example, the image data of the first image capture from all of the pixel cells 104 of pixel array 102 are then globally and simultaneously captured and stored in the voltage domain in respective first capacitors in the sample and hold circuit array 118. After the first image is captured without any illumination from the infrared illumination source 120, the infrared illumination source 120 is then activated to illuminate the foreground of the external scene and a second image of the illuminated external scene is then captured. In the example, the image data of the second image capture from all of the pixel cells 104 of pixel array 102 are then globally and simultaneously captured and stored in the voltage domain in respective second capacitors in the sample and hold circuit array 118.

In one example, the control circuit 110 is configured to generate an illumination signal ILLUM_SIG 174 that is coupled to be received by the infrared illumination source 120 to control the infrared illumination source 120. In one example, the infrared illumination source 120 is configured to direct infrared pulses having a pulse width of approximately ~10 microseconds at a wavelength substantially equal to 940 nanometers to the external scene that is being captured by the imaging system 100. It is appreciated that ambient sunlight in the external scene happens to have a relatively weak spectrum near 940 nanometers at sea level. As a result, the sunlight will have a reduced impact or effect on the external scene at the 940 nanometer wavelength compared to the infrared illumination source 120.

In one example, the data rate of the imaging system is 60 frames per second, where each frame includes the first and second image captures, with the first image capture being unilluminated by the infrared illumination source 120, and the second image capture being illuminated by the infrared illumination source 120. In the various examples, the control circuit 110 is configured to regulate the wavelength and power of the infrared light emitted from the infrared illumination source 120 to control the overall heat generated by the infrared illumination source 120 that is directed at the objects in the external scene.

Figure 2:
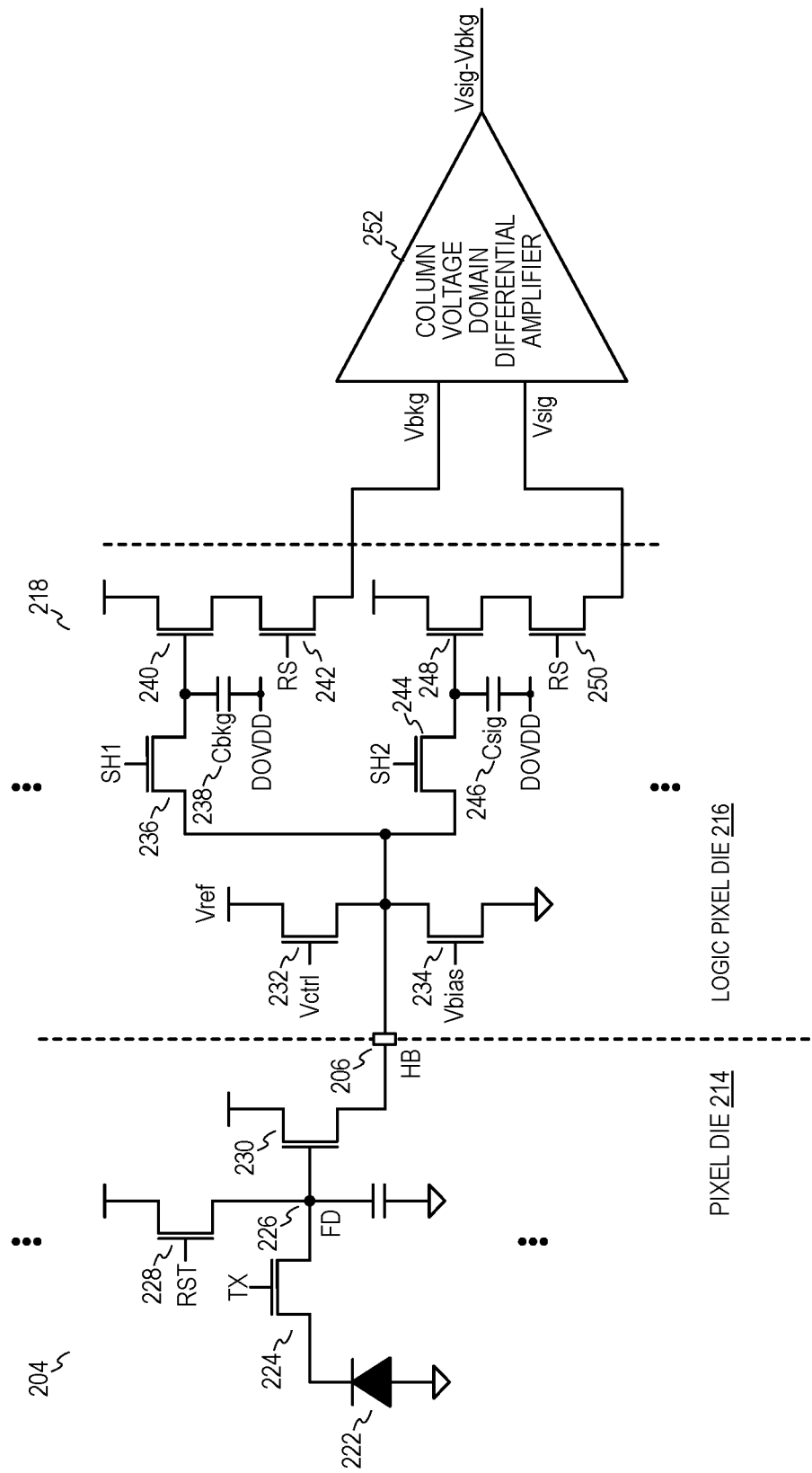
FIG. 2 illustrates a schematic that shows an example of a pixel cell coupled to sample and hold circuit and a full column differential amplifier included in a voltage domain global shutter image sensor in accordance with the teachings of the present invention.

FIG. 2 illustrates a schematic that shows an example of a pixel cell 204 coupled to sample and hold circuit 218 and a full column differential amplifier included in a voltage domain global shutter image sensor of an imaging system in accordance with the teachings of the present invention. It is noted that pixel cell 204 and sample and hold circuit 218 of FIG. 2 may be examples of one of the pixel cells 104 and one of the sample and hold circuits of the sample and hold circuit array 118 described in FIG. 1, and that similarly named and numbered elements referenced below are coupled and function similar to as described above.

The example illustrated in FIG. 2 shows a pixel die 214, which is stacked with a logic pixel die 218 as described in FIG. 1. In the example, the pixel die 214 includes a pixel array that includes pixel cell 204, and the logic pixel die 216 includes an array of sample and hold circuits that includes sample and hold circuit 218, which is coupled to pixel cell 204 through a respective pixel level hybrid bond 206 at an interface between pixel die 214 and logic pixel die 216 as shown.

As shown in the depicted example, pixel cell 204 includes a photodiode 222, which is coupled to photogenerate image charge in response to incident light. In one example, the light incident on photodiode 222 may be ambient light only from an external scene without any illumination from the infrared illumination source 120 during the first image capture, or the light incident on photodiode 222 may include infrared light reflected from the external scene from the infrared illumination source 120 during the second image capture.

A transfer gate 224 is coupled to transfer the photogenerated image charge from the photodiode 222 to a floating diffusion 226 in response to a transfer signal TX. A reset transistor 228 is coupled to a supply voltage to reset the floating diffusion 226, and the photodiode 222 through transfer gate 224, in response to a reset signal RST. The gate of a source follower transistor 230 is coupled to convert the image charge in the floating diffusion 226 from the charge domain to an image charge voltage signal in the voltage domain, which is coupled to be output through the pixel level hybrid bond 206 from pixel die 214 to the respective sample and hold circuit 218 on the logic pixel die 216.

It is noted that in the voltage domain global shutter example illustrated in FIG. 2, pixel cell 204 does not include a row select transistor coupled to the source follower transistor 230. As such, in the example depicted in FIG. 2, the drain of the source follower transistor 230 is coupled to the supply voltage through a first unswitched connection, and the source of the source follower transistor 230 is coupled to the pixel level hybrid bond 206 through a second unswitched connection.

Continuing with the depicted example, the sample and hold circuit 218 includes a first sample and hold transistor 236 that is coupled to the pixel level hybrid bond 206 and is configured to sample and hold in response to a sample and hold control signal SH1 a first image charge voltage signal of a first image capture from pixel cell 204 into a first capacitor Cbkg 238, which is coupled between first sample and hold transistor 236 and a low supply voltage DOVDD. In the example, the low supply voltage DOVDD is lower in value than the supply voltage, which is configured to power the sample and hold circuit 218. In one example, the low supply voltage DOVDD may be coupled to ground. In addition, the sample and hold circuit 218 also includes a second sample and hold transistor 244 that is coupled to the pixel level hybrid bond 206 and is configured to sample and hold in response to a sample and hold control signal SH2 a second image charge voltage signal of a second image capture from pixel cell 204 into a second capacitor Csig 246, which is coupled between second sample and hold transistor 244 and the low supply voltage DOVDD. In one example, the first capacitor Cbkg 238 and the second capacitor Csig 246 each have a capacitance value equal to approximately 130 femtofarads.

In the depicted example, the sample and hold circuit 218 includes a current source implemented with a transistor 234 that is biased with a bias voltage Vbias and is coupled between the pixel level hybrid bond 206 and ground. In one example, the sample and hold circuit 218 also includes a reference transistor coupled between the pixel level hybrid bond 206 and a reference voltage Vref. In the example, the reference transistor is configured to couple the reference voltage Vref to the pixel level hybrid bond 206 in response to a reference voltage control signal Vctrl.

Figure 3:
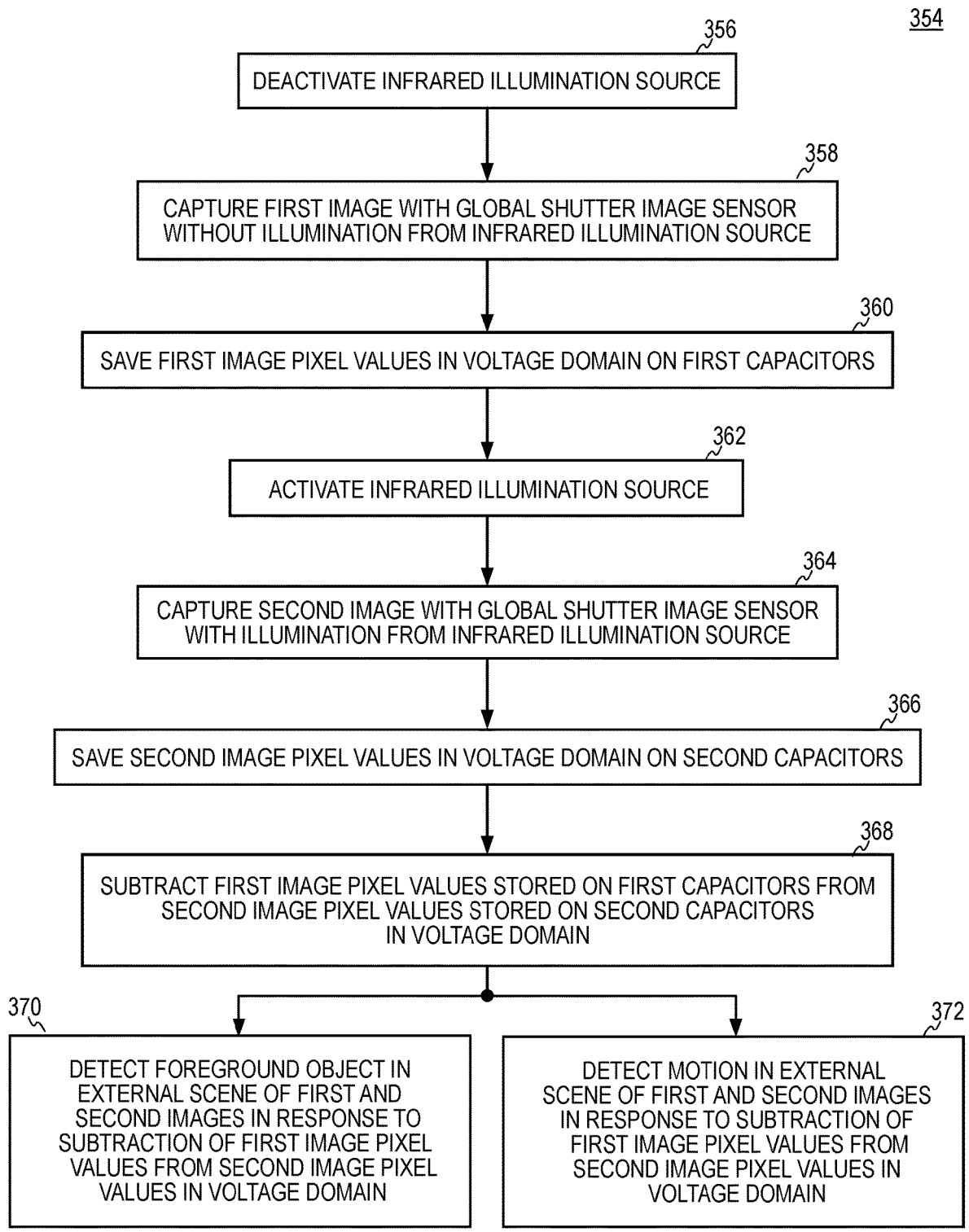
FIG. 3 is a flow diagram illustrating an example process to detect an object in the foreground and/or detect motion of the object in an external scene with an example voltage domain global shutter image sensor with an infrared illumination source in accordance with the teachings of the present invention.

The example depicted in FIG. 3 shows that the sample and hold circuit 218 also includes a first source follower transistor 240 that has a gate coupled to the first capacitor Cbkg 238 to drive a voltage Vbkg in response to the first image charge voltage signal stored in the first capacitor Cbkg 238. The voltage Vbkg driven by the first source follower transistor 240 is output through a first row select transistor 242 in response to a row select signal RS that is coupled to be received at a first input of column voltage domain differential amplifier 252. In addition, sample and hold circuit 218 also includes a second source follower transistor 248 that has a gate coupled to the second capacitor Csig 246 to drive a voltage Vsig in response to the second image charge voltage signal stored in the second capacitor Csig 246. The voltage Vsig driven by the second source follower transistor 248 is output through a second row select transistor 250 in response to the row select signal RS that is coupled to be received at a second input of column voltage domain differential amplifier 252.

In the depicted example, the column voltage domain differential amplifier 252 is a full column voltage domain differential amplifier that is coupled to each sample and hold circuit 218 that is included in a column of the sample and hold circuit array 118. In operation, the column voltage domain differential amplifier 252 is configured to output a difference between the first image charge voltage signal and the second image charge voltage signal by subtracting the Vbkg voltage from the Vsig voltage. In other words, the output of the column voltage domain differential amplifier 252 is Vsig-Vbkg. As such, the image sensor is configured to identify an object in the foreground of the external scene that is illuminated by the infrared illumination source 120 in response to the detected differences between the first and second captured images determined by subtracting the first image from the second image in accordance with the teachings of the present invention. In addition, the image sensor is configured to identify motion in the external scene that is illuminated by the infrared illumination source 120 in response to the detected differences between the first and second captured images determined by subtracting the first image from the second image in accordance with the teachings of the present invention.

FIG. 3 is a flow diagram illustrating an example process 354 to detect an object in the foreground and/or detect motion of the object in an external scene with an example voltage domain global shutter image sensor and an infrared illumination source in accordance with the teachings of the present invention. It is noted that process 354 of FIG. 3 refers to processing steps that may be performed by examples of the pixel cells 204 and sample and hold circuits 218 of FIG. 2, or pixel cells 104 and sample and hold circuits included in sample and hold circuit array 118 of described in FIG. 1, and that similarly named elements referenced below are coupled and function similar to as described above.

As shown in the example depicted in FIG. 3, processing beings in process block 356 by deactivating the infrared illumination source. As a result, the external scene is not illuminated by the infrared illumination source such that the external scene is illuminated with ambient light.

Process block 358 shows that a first image is then captured with a voltage domain global shutter image sensor as described above without any illumination from the infrared illumination source. It is appreciated that this first image capture is an image capture of the background of the external scene.

Process block 360 shows that pixel values of the first image are saved in the voltage domain on first capacitors. In the examples described above, the first image pixel values may be converted from the image charge that is generated by photodiode 222 and saved in the floating diffusion 226 in the charge domain into the voltage domain with the pixel source follower transistor 230. The converted first image pixel value may then be stored in the first capacitor Cbkg 238 in the voltage domain.

Process block 362 shows that the infrared illumination source is then activated, which in one example is configured to illuminate objects in the foreground of the external scene with infrared light. In one example, the infrared light used to illuminate the foreground objects in the external scene has a wavelength of approximately 940 nanometers and is therefore not visible to the human eye. In one example, the infrared light is directed to the foreground objects in the external scene with infrared pulses having a pulse width of approximately ~10 microseconds.

Process block 364 shows that a second image is then captured with the voltage domain global shutter image sensor as described above with illumination from the infrared illumination source. It is appreciated that this second image capture is an image capture of the external scene with the foreground objects illuminated with infrared light from the illumination source.

Process block 366 shows that second image pixel values are saved in the voltage domain on second capacitors. As in the examples described above, the second image pixel values may be converted from the image charge that is generated by photodiode 222 and saved in the floating diffusion 226 in the charge domain into the voltage domain with the pixel source follower transistor 230. The converted second image pixel value may then be stored in the second capacitor Csig 246 in the voltage domain.

Process block 368 shows that the differences between the first captured image and the second captured image may be determined by subtracting the first captured image pixel values from the second captured image pixel values stored in the first and second capacitors in the voltage domain.

Process block 370 shows that a foreground object in external scene of first and second images is then detected in response to the subtraction of first image pixel values from second image pixel values in voltage domain as performed in process block 368.

Process block 372 shows that motion in external scene of first and second images is then detected in response to subtraction of first image pixel values from second image pixel values in voltage domain as performed in process block 368.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging system, comprising:
an array of pixels configured to generate image charge voltage signals in response to incident light received from an external scene;
a control circuit coupled to the array of pixels to control operation of the array of pixels, wherein the control circuit is configured to control the array of pixels to capture a first image of the external scene and a second image of the external scene in sequence;
an infrared illumination source configured to illuminate the external scene in response to the control circuit, wherein the control circuit is configured to deactivate the infrared illumination source during the capture of the first image of the external scene, wherein the control circuit is configured to activate the infrared illumination source during the capture of the second image of the external scene;
an array of sample and hold circuits coupled to the array of pixels, wherein each one of the sample and hold circuits is coupled to a respective one of the pixels of the array of pixels, wherein each one of the sample and hold circuits comprises:
a first capacitor configured to store a first image charge voltage signal of the first image; and
a second capacitor configured to store a second image charge voltage signal of the second image; and
a column voltage domain differential amplifier coupled to the first capacitor and the second capacitor of each one of the sample and hold circuits in a column of the array of sample and hold circuits, wherein the column voltage domain differential amplifier is configured to determine a difference between the second image charge voltage signal and the first image charge voltage signal stored in each one of the sample and hold circuits to identify an object in a foreground of the external scene.

2. The imaging system of claim 1, wherein the column voltage domain differential amplifier is further configured to detection motion in the external scene in response to the difference between the second image charge voltage signal and the first image charge voltage signal stored in each one of the sample and hold circuits.

3. The imaging system of claim 1, wherein the infrared illumination source configured to generate infrared light having a wavelength substantially equal to 940 nanometers.

4. The imaging system of claim 3, wherein the infrared illumination source configured to generate infrared light pulses having a pulse width substantially equal to 10 microseconds.

5. The imaging system of claim 4, wherein the imaging system is configured to capture the first image of the external scene, capture the second image of the external scene, and determine the difference between the second image charge voltage signal and the first image charge voltage signal stored in each one of the sample and hold circuits 60 times per second.

6. The imaging system of claim 1, wherein the first and second capacitors have capacitance values equal to approximately 130 femtofarads.

7. The imaging system of claim 1, further comprising:
a first semiconductor die comprising the array of pixels; and
a second semiconductor die stacked with and coupled to the first semiconductor die, wherein the second semiconductor die comprises the array of sample and hold circuits and the readout circuit.

8. The imaging system of claim 7, wherein each one of the pixels of the array of pixels comprises:
a photodiode configured to generate image charge in response to the incident light received from the external scene;
a floating diffusion configured to store the image charge generated by the photodiode;
a transfer gate coupled between the photodiode and the floating diffusion;
a reset transistor coupled between the floating diffusion and a supply voltage; and
a pixel source follower transistor having a gate coupled to the floating diffusion, a drain coupled to the supply voltage, and a source coupled to a hybrid bond at an interface between the first semiconductor die and the second semiconductor die.

9. The imaging system of claim 8, wherein the drain of the pixel source follower transistor is coupled to the supply voltage through a first unswitched connection, wherein the source of the pixel source follower transistor is coupled to the hybrid bond through a second unswitched connection.

10. The imaging system of claim 8, wherein each one of the sample and hold circuit further comprises:
a first sample and hold transistor coupled between the hybrid bond and the first capacitor;
a first source follower transistor having a gate coupled to the first capacitor;
a first row select transistor coupled between the first source follower transistor and a first input of the column voltage domain differential amplifier;
a second sample and hold transistor coupled between the hybrid bond and the second capacitor;
a second source follower transistor having a gate coupled to the second capacitor; and
a second row select transistor coupled between the first source follower transistor and a first input of the column voltage domain differential amplifier.

11. The imaging system of claim 10, wherein each one of the sample and hold circuit further comprises a current source coupled between the hybrid bond and ground, wherein the current source comprises a current source transistor having a gate coupled to receive a bias voltage.

12. The imaging system of claim 11, wherein each one of the sample and hold circuit further comprises a reference transistor coupled between the hybrid bond and a reference voltage, wherein the reference transistor is configured to provide the reference voltage to the hybrid bond in response to a reference voltage control signal.

13. The imaging system of claim 1, wherein the column voltage domain differential amplifier is included in a readout circuit coupled to receive image charge voltage signals of the first image from the array of pixels and image charge voltage signals of the second image.

\* \* \* \* \*